(12) United States Patent
Tian et al.

(10) Patent No.: US 9,990,263 B1
(45) Date of Patent: Jun. 5, 2018

(54) EFFICIENT USE OF SPARE DEVICE(S) ASSOCIATED WITH A GROUP OF DEVICES

(71) Applicant: Tintri Inc., Mountain View, CA (US)

(72) Inventors: Lei Tian, Mountain View, CA (US); Shobhit Dayal, San Francisco, CA (US); Edward K. Lee, Dublin, CA (US)

(73) Assignee: Tintri Inc., Mountain View, CA (US)

( * ) Notice: Subject to any disclaimer, the term of this patent is extended or adjusted under 35 U.S.C. 154(b) by 120 days.

(21) Appl. No.: 15/074,501

(22) Filed: Mar. 18, 2016

Related U.S. Application Data

(60) Provisional application No. 62/136,216, filed on Mar. 20, 2015.

(51) Int. Cl.
| G06F 11/00 | (2006.01) |
| G06F 11/20 | (2006.01) |
| G06F 11/10 | (2006.01) |

(52) U.S. Cl.
CPC ...... *G06F 11/2094* (2013.01); *G06F 11/1092* (2013.01); *G06F 2201/805* (2013.01)

(58) Field of Classification Search
CPC ............. G06F 11/1088; G06F 11/1092; G06F 11/2094
See application file for complete search history.

(56) References Cited

U.S. PATENT DOCUMENTS

| 6,223,252 B1 * | 4/2001 | Bandera ............. G06F 11/2069 711/112 |
| 7,827,351 B2 * | 11/2010 | Suetsugu ............ G06F 11/1092 711/114 |
| 9,128,910 B1 * | 9/2015 | Dayal .................... G06F 11/22 |
| 2002/0032882 A1 * | 3/2002 | Mann .................. G06F 11/1076 714/6.11 |
| 2003/0016596 A1 * | 1/2003 | Chiquoine .......... G06F 11/1076 369/34.01 |
| 2003/0212858 A1 * | 11/2003 | Apperley ............ G06F 11/1076 711/114 |
| 2009/0106491 A1 * | 4/2009 | Piszczek ............. G06F 11/1076 711/114 |
| 2012/0084505 A1 * | 4/2012 | Colgrove ............ G06F 11/1076 711/114 |
| 2013/0117525 A1 * | 5/2013 | Jess ........................ G06F 3/0611 711/171 |
| 2013/0205167 A1 * | 8/2013 | Deepak ............... G06F 11/2094 714/6.24 |

(Continued)

OTHER PUBLICATIONS

Anonymous, A method to expand SSD cache using hot spare disks, Jan. 6, 2014, IP.com, all pages.*

(Continued)

*Primary Examiner* — Marc Duncan
(74) *Attorney, Agent, or Firm* — Van Pelt, Yi & James LLP

(57) ABSTRACT

Efficient use of spare device(s) associated with a group of devices is disclosed, including: receiving a set of data; storing the set of data across a group of devices according to a protocol; determining a set of additional data units associated with the set of data; and storing the set of additional data units in a spare device associated with the group of devices, wherein the spare device is available to be used in the event of a failure of a device included in the group of devices, including by overwriting the set of additional data units as needed.

18 Claims, 15 Drawing Sheets

(56) References Cited

U.S. PATENT DOCUMENTS

| | | | |
|---|---|---|---|
| 2015/0019918 A1* | 1/2015 | Li | G06F 11/108 714/54 |
| 2016/0019114 A1* | 1/2016 | Han | G06F 11/1076 714/764 |
| 2016/0188424 A1* | 6/2016 | Walls | G06F 11/1662 714/6.3 |

OTHER PUBLICATIONS

Horn, Robert, Using Hot Spare Disk Drive for Performance Enhancement in a RAID System, Sep. 4, 2003, IP.com, all pages.*

* cited by examiner

US 9,990,263 B1

EFFICIENT USE OF SPARE DEVICE(S) ASSOCIATED WITH A GROUP OF DEVICES

CROSS REFERENCE TO OTHER APPLICATIONS

This application claims priority to U.S. Provisional Patent Application No. 62/136,216 entitled EFFICIENT USE OF SPARE DRIVE(S) TO IMPROVE RELIABILITY AND PERFORMANCE OF PARITY-ENCODED RAIDS filed Mar. 20, 2015 which is incorporated herein by reference for all purposes.

BACKGROUND OF THE INVENTION

It is critically important for storage systems to satisfy the demanding requirements of high reliability and availability. It has been a big challenge for conventional hard disk drive (HDD)-based redundant array of independent disks (RAIDs) for a long time, and this problem becomes even more challenging for solid-state disk (SSD)-based RAIDs because flash cells have limited erasure cycles (e.g., typically TLC flash cells only have about 1,000 erasure cycles). In addition to complete drive failures, SSDs also suffer from partial failures including read disturb errors, write errors, and retention errors. Therefore, it is desirable to further enhance system reliability and availability of HDD-based or SSD-based RAIDs beyond conventional parity-encoding schemes.

Additionally, HDDs and SSDs under read and write workloads also always suffer from high latencies, due to internal processes like firmware bugs, transient errors, garbage collection, wear leveling, internal metadata persistence, etc. Because RAID-based storage systems, especially those with SSDs, are expected to provide low latency, it is important to overcome this limitation and consistently provide low latency for user I/O.

BRIEF DESCRIPTION OF THE DRAWINGS

Various embodiments of the invention are disclosed in the following detailed description and the accompanying drawings.

DETAILED DESCRIPTION

Figure 1:
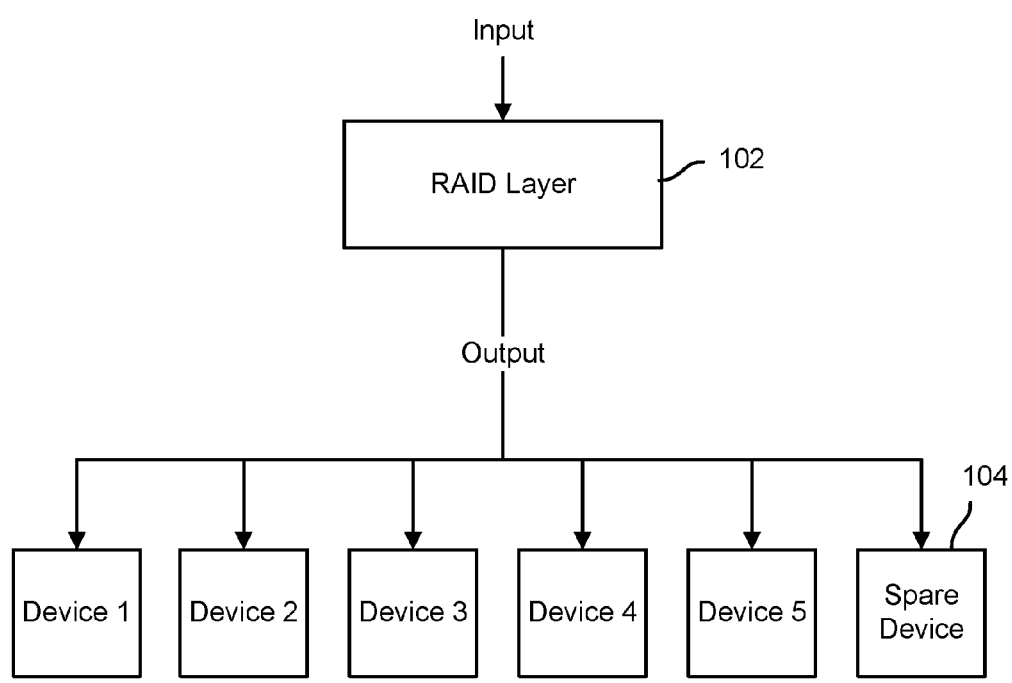
FIG. 1 is a redundant storage system in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In a storage array, one or more spare devices are kept available for rebuilding failed drives. This improves system reliability and availability by allowing reconstruction of the data on the failed device to begin immediately. However, during a period when no device has failed, a spare device is unutilized.

Embodiments of efficient use of spare device(s) associated with a group of devices are described herein. In various embodiments, the spare device(s) associated with a group of devices is configured to store one or more extra sets of parity information to further improve system reliability. In various embodiments, the group of devices comprises a redundant set of storage systems, such as a RAID group, for example. In various embodiments, a set of data is stored across the group of devices according to a protocol. For example, if the group of devices comprises a RAID group, then the data would be stored across the various stripes of the RAID group based on a protocol/scheme that is associated with that particular RAID group. For example, the scheme could be RAID 5 or RAID 6. In various embodiments, the set of additional data units is determined based at least in part on the set of data. In various embodiments, the set of additional data units comprises an extra set of parity information that is different from and/or additional to any already-existing parity information that is generated and stored based on protocol of the group of devices. In some embodiments, the set of additional data units comprises cached data (e.g., the data that is copied from a lower performance storage tier). In some embodiments, the set of additional data units comprises cached metadata (e.g., the metadata could describe attributes of the stripes of data in the group of devices). In various embodiments, the set of additional data units is stored in a spare device associated with the group of devices. The spare device comprises a device that is not already included in the group of devices or a device that that does not store data based on the protocol on which the storage of data in the group of devices is based. In the event that a device included in the group of devices fails or it is otherwise appropriate to reconstruct the data associated with a device included in the group of devices, in various embodiments, reconstructed data associated with the device is stored in the spare device by overwriting at least some of the set of additional data units that is stored in the spare device. As such, embodiments described herein utilize one or more spare devices associated with a group of devices to store a set of additional data units while the spare device(s) are not needed to store reconstructed data but permit the set of additional data units to be overwritten by reconstructed data when such a need arises.

FIG. 1 is a redundant storage system in accordance with some embodiments. In FIG. 1, at least Devices 1, 2, 3, 4, and 5 form a group of redundant storage devices. The group of redundant storage devices is associated with spare device 104 that does not store data based on the same protocol that is used to store data and/or parity information across the group of redundant storage devices. For example, in the example shown in FIG. 1, each of Devices 1, 2, 3, 4, and 5 and spare device 104 may be a hard disk drive (HDD) or a solid state drive (SSD). The Devices 1, 2, 3, 4, and 5 form a RAID (Redundant Array of Independent Disks) group that is managed in part by RAID layer 102. The Devices 1, 2, 3, 4, and 5 in the RAID group comprise a logical container. At least some of Devices 1, 2, 3, 4, and 5 are configured to store at least some data that is redundantly stored on one or more other devices of the group based on a protocol of data distribution of a RAID scheme that is associated with the RAID group. Typically, data stored in a RAID group is "striped" across the devices such that logically sequential data is segmented in a way that accesses of sequential segments can be made to different devices. A "stripe" refers to a group of stripe units, where each unit belongs to one device in the group. A "stripe unit" is a sub part of a device and so a "stripe" is a group of stripe units. For example, a RAID group can comprise of 10 devices each of size 100 GB. A stripe unit can be a 2 MB continuous region of a device. Then a stripe is the group of 2 MB stripe units on each drive taken together to form a 20 MB region. RAID layer 102 is configured to receive an input set of data, process the input data according to a protocol of data distribution (e.g., generate parity information based on the input data) that is applied to the RAID group, and store the outputted data across Devices 1, 2, 3, 4, and 5 according to the protocol of data distribution that is applied to the RAID group. As will be described in further detail below, in various embodiments, RAID layer 102 is further configured to store a set of additional data units in spare device 104 in a manner that is not associated with a conventional data processing and/or data distribution protocol that is associated with the RAID group. In some embodiments, the set of additional data units is generated by RAID layer 102 based on the input data that it received. For example, the set of additional data units that is generated by RAID layer 102 based on the input data that it received comprises a set of parity information that is in addition to any already-existing sets of parity information that are required by the data distribution protocol that is associated with the RAID group. In some embodiments, the set of additional data units is received by RAID layer 102 as a part of the input data that it had received. For example, the set of additional data units that is received by RAID layer 102 as part of the input data that it had received comprises a set of cached data and/or a set of cached metadata. Regardless of whether the set of additional data units is generated or received by RAID layer 102, the set of additional data units is stored by RAID layer 102 at spare device 104 and not in any of Devices 1, 2, 3, 4, and 5.

In various embodiments, RAID layer 102 is configured at least in part to receive requests from an application and to send the requested data back to the application. One advantage of a RAID group is the fault tolerance provided by the redundancy of data stored among the devices of the group. In the event that a device in the group fails (e.g., when a disk controller informs the RAID controller that an operation to read data at the disk has failed), the data stored on the failed device is reconstructed using data/parity on the remaining, available devices of the group. For example, in a typical RAID group, parity data written on an available drive may be used, along with data read from other available devices, to reconstruct data that was stored on a failed device or that has become corrupted as stored on a device. When exclusive or (XOR) parity is used, for example, the parity data may be used to perform XOR computations using the parity data and related data in a set of data values that has been striped across devices in the RAID group to reconstruct data that cannot be read because a device on which it was stored has failed. In various embodiments, when a device in the group fails or it is otherwise appropriate to reconstruct the data associated with that device, at least some of the set of additional data units of spare device 104 that comprises an extra set of parity information can be used to reconstruct the data of the device. Furthermore, in various embodiments, the reconstructed data associated with the failed device of the group can be written to spare device 104 by overwriting at least some of the set of additional data units that was used to generate the reconstructed data. Subsequent to the reconstruction operation, requests that are received at RAID layer 102 that are associated with the failed device can be redirected to spare device 104, which stores the reconstructed data of the failed device.

Figure 2:
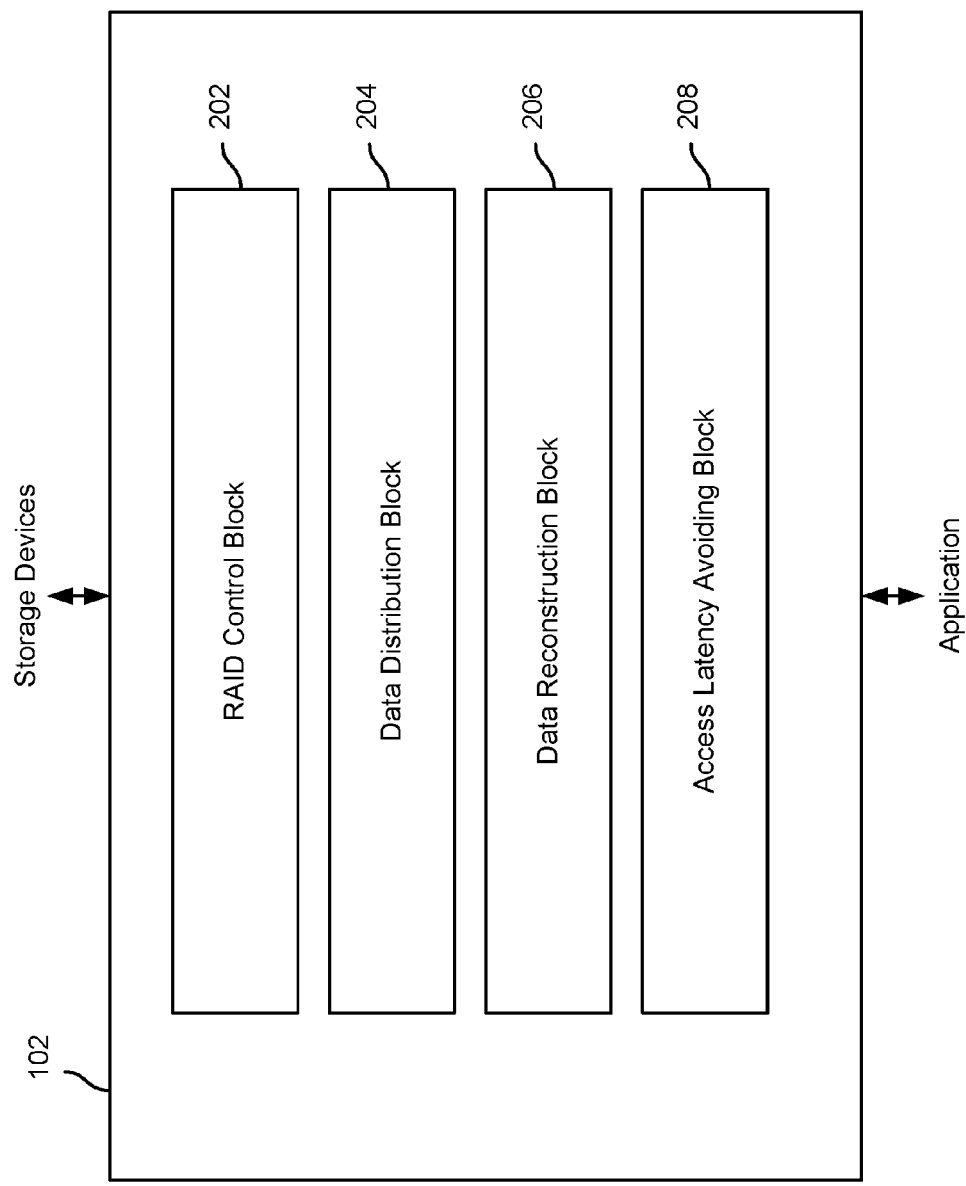
FIG. 2 is a diagram showing a RAID layer in accordance with some embodiments.

FIG. 2 is a diagram showing a RAID layer in accordance with some embodiments. In some embodiments, RAID layer 102 of FIG. 1 can be implemented using the example of FIG. 2. In some embodiments, RAID layer 102 is configured to manage a group of redundant storage devices that comprises a RAID group. For example, each of the storage devices in the group comprises a hard disk drive (HDD) or a solid state disk (SSD). In some embodiments, RAID layer 102 is at least part of a storage system that includes at least the RAID group. In some embodiments, RAID layer 102 and the blocks included in the layer are implemented using one or both of software and hardware. In the example, RAID layer 102 includes at least RAID control block 202, data distribution block 204, data reconstruction block 206, and access latency avoiding block 208. RAID control block 202 is at least configured to receive requests (e.g., read requests or write requests sent by an application), to service the requests, and to send the results (e.g., requested data) back to the requesting application.

Data distribution block 204 is configured to receive input data and store the input data across the devices of the group of redundant devices as stripes. If a protocol associated with data distribution of the group of redundant storage systems (e.g., a particular RAID-based scheme) requires that one or more sets of parity information are stored across the group of redundant devices, than data distribution block 204 is configured to generate these sets of parity information based on the input data and store the generated sets of parity information across the group of devices. In various embodiments, a system configuration dictates what type of data is to be stored as a set of additional data units on a spare device associated with the group of devices. In various embodiments, data distribution block 204 is configured to read the stored system configuration that dictates what type of data is to be stored as a set of additional data units on a spare device and obtains the set of additional data units accordingly. In some embodiments, the stored system configuration can dictate that the set of additional data units comprises one or more of: an extra set of parity information (that is in addition to any already-existing parity information that is generated based on the data distribution protocol of the group of devices), a set of cached data, and a set of cached metadata. In the event that the stored system configuration dictates that the set of additional data units includes the extra set of parity information, then data distribution block 204 is configured to generate the extra set of parity information based on a predetermined correction code (e.g., Reed-Solomon) using at least a portion of the data input into RAID layer 102. However, in the event that the stored system configuration dictates that the set of additional data units includes either a set of cached data and/or a set of cached metadata, then data distribution block 204 is configured to directly include the portion of the data input into RAID layer 102 that includes such a set of cached data and/or a set of cached metadata in the set of additional data units. Whereas the spare device that is associated with the device of groups is conventionally left empty and/or otherwise unutilized, data distribution block 204 is configured to store the obtained set of additional data units to the spare device that is associated with the group of devices.

Data reconstruction block 206 is configured to generate reconstructed data associated with a device of the group of devices. In some embodiments, data stored on a device needs to be reconstructed from the other devices in the group in the event that the device fails. In some embodiments, if the set of additional data units comprises an extra set of parity information that is not stored in any of the devices of the group, data reconstruction block 206 is configured to use at least some of the set of additional data units that are stored in the spare device, in addition to data values stored on at least one other device in the group, to reconstruct the data associated with the failed device. The reconstructed data is then stored in the spare device including by overwriting at least a portion of the set of additional data units that remain stored in the spare device. After the reconstruction operation is complete, the spare device is now included in the group of devices and stores only the reconstructed data associated with the failed device and will service requests that would have otherwise been serviced by the failed device. In some embodiments, sometime during the reconstruction operation, the failed device is removed and a new spare device associated with the group of devices is added. Then, a set of additional data units can be stored in the new spare device until the next device in the group fails and data needs to be reconstructed for that device.

Access latency avoiding block 208 is configured to respond to a request directed to a device that is associated with a slow access mode with data reconstructed from at least some of the other devices of the group. In some embodiments, a "slow access mode" refers to a time period in which a storage device performs slower than usual access. Example causes for the slow access mode is that the storage device is performing internal activities such as garbage collection, defragmenting, updating metadata, etc., or due to firmware bugs, transient errors in the storage device. For example, RAID layer 102 is configured to initially send a request to one device in the group of redundant storage devices based on, for example, a determination that the device stores the data that is requested and/or an identifier in the request associated with that device. In some embodiments, access latency avoiding block 208 is configured to determine a timeout duration for each request. In some embodiments, access latency avoiding block 208 is configured to determine a specific timeout duration for each request based on factors such as one or more of the following: a fixed timeout length assigned (e.g., by a system administrator) to the device, a size of data requested, a priority associated with the request, a priority associated with the device, a priority associated with the entity (e.g., an application or other caller) that issued the request (e.g., because some requesting entities are more sensitive to latency than others), and a current queue length associated with the device. If the device to which the request was initially sent does not respond to the request by the end of the timeout duration (e.g., due to the device being in a slow access period), then the storage device is assumed to be in a slow access mode and access latency avoiding block 208 is configured to service the request using one or more devices other than the device to which the request was initially sent and/or the spare device. For example, access latency avoiding block 208 can issue the request to one or more other storage devices and/or the spare device by invoking a reconstruction operation to be performed by data reconstruction block 206. Data reconstruction block 206 is configured to issue requests to other devices of the group and/or the spare device that stores at least some of the requested data on the first device and/or parity information (the set of additional data units) that could be used to reconstruct the data requested from the first device. Once the other devices of the group and the spare device receive the reconstruction operation requests, the other devices of the group and the spare device will respond with the relevant data and/or parity information (at least portion of the set of additional data units) needed by RAID layer 102 to reconstruct the requested data, which will be sent back to the requesting entity.

In some embodiments, access latency avoiding block 208 is configured to determine a scheduled time for each of the devices in the group to be forced to enter the slow access period. For example, a storage device may be "forced" to enter a slow access period using a special command associated with sending/forcing the device into such a slow access period (e.g., using a special command that is designated by the vendor of the storage device or by sending a command that has been observed or otherwise been determined to cause the device to enter its slow access period). In some embodiments, access latency avoiding block 208 is configured to determine a different scheduled slow access period start time for each device in the group of devices. In some embodiments, access latency avoiding block 208 is configured to determine the schedule of device forced slow access periods such that no two different devices will be in a slow access period during overlapping times. This way, all but one of a group of devices storing at least some redundant data and/or parity information can still be available to service incoming requests. In some embodiments, access latency avoiding block 208 is configured to schedule slow access periods for the devices in the group based on the performances or other changing states of the storage devices. In some embodiments, access latency avoiding block 208 is configured to schedule a slow access period to occur for a device not substantially more than the frequency that the storage device would enter a slow access period on its own, without being forced to enter such a period. As such, when slow access periods have been scheduled for the group of devices, for a subsequently received request, access latency avoiding block 208 is configured to determine whether the request is associated with a device that is currently in a scheduled slow access period. In some embodiments, if the device is currently in a scheduled slow access period, then access latency avoiding block 208 is configured to immediately fulfill the request using one or more other devices and/or the spare device and not wait out a timeout duration (if one has been determined for the request). For example, access latency avoiding block 208 can issue the request to one or more other devices and/or the spare device using a reconstruction operation.

Figure 3:
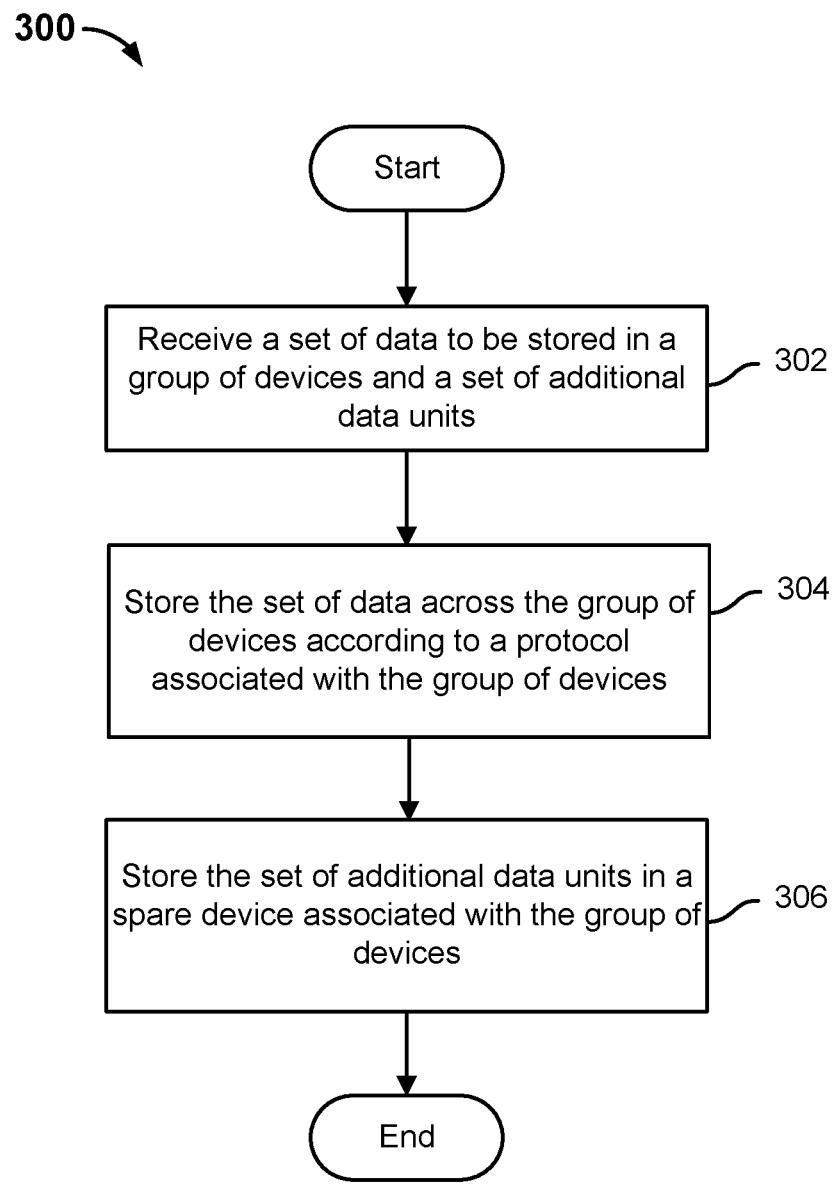
FIG. 3 is a flow diagram showing a process for storing data at a spare device associated with a group of devices in accordance with some embodiments.
Figure 4:
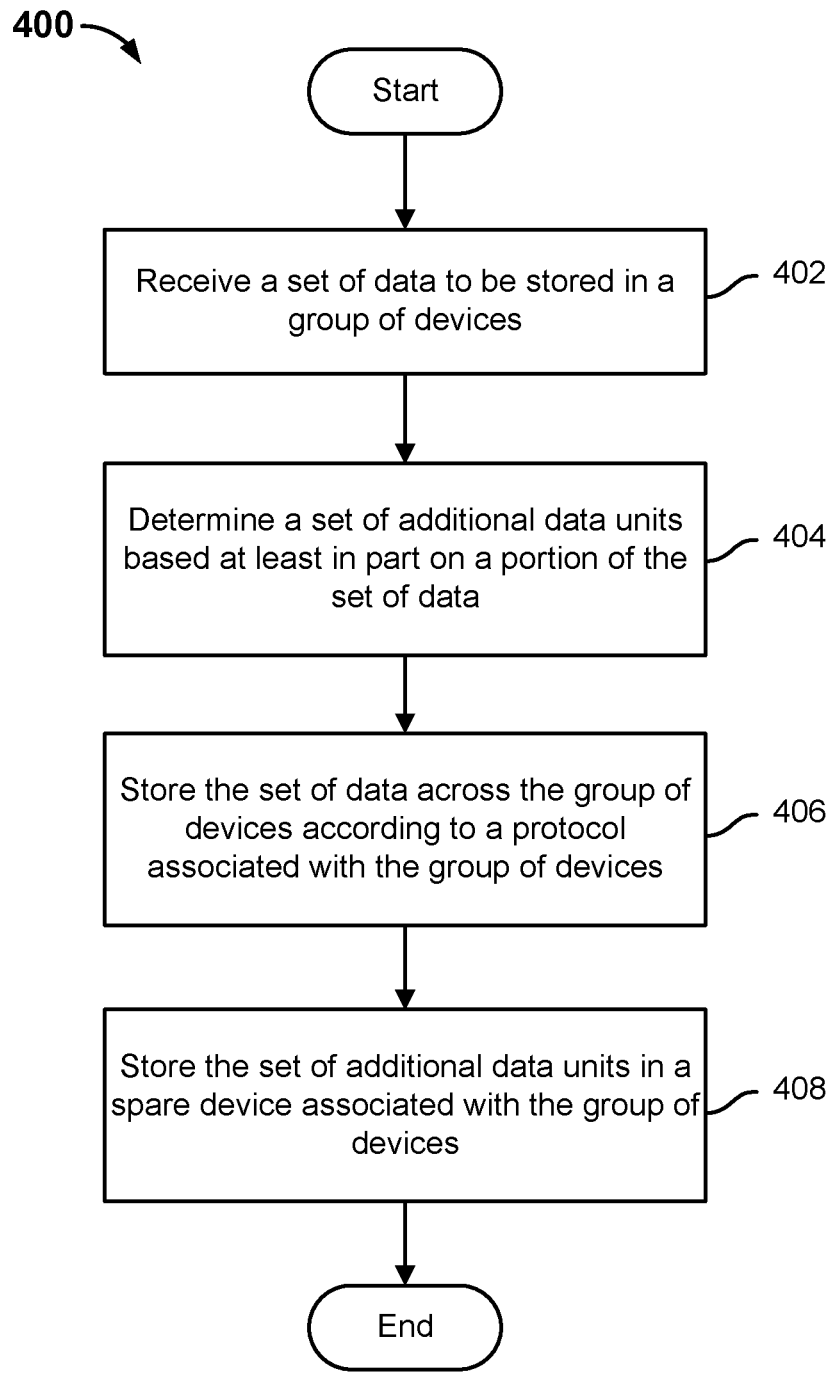
FIG. 4 is a flow diagram showing a process for storing data at a spare device associated with a group of devices in accordance with some embodiments.

FIGS. 3 and 4 show two example processes of storing different types of additional data units at a spare device associated with a group of devices. One or both of process 300 of FIG. 3 and process 400 of FIG. 4 can be implemented, depending on, for example, the type of data that is received at the RAID layer and/or a stored system configuration that dictates which type(s) of data is to store as a set of additional data units on a spare device.

FIG. 3 is a flow diagram showing a process for storing data at a spare device associated with a group of devices in accordance with some embodiments. In the example, process 300 is implemented using RAID layer 102 of FIG. 1.

At 302, a set of data to be stored in a group of devices and a set of additional data units are received. In various embodiments, the group of devices comprises a group of redundant storage devices. For example, the group of devices comprises a RAID group. The received set of data comprises user data, for example, that is to be stored across various stripes of the group of devices. The set of additional data units is not designated to be stored in any device within the group of devices but at a spare device that is associated with the group of devices and is typically not utilized unless reconstruction data is to be stored in the spare device.

In some embodiments, the received set of additional data units comprises data to be cached at the spare device. In various embodiments, data for which the spare device is to act as a cache comprises data that is copied over from a lower performance storage tier. For example, if the storage devices of the group are SSD storage devices, then some data that is normally stored in HDD storages, which is associated with slower accesses than SSD storage devices, can be copied and cached at the spare device.

In some embodiments, the received set of additional data units comprises metadata to be cached at the spare device. A first example of such metadata can be a bitmap that indicates which stripes of each device of the group are used and which are free. In some embodiments, a "used stripe" refers to a stripe whose data contents have not been deleted or overwritten. As an example, contents of a stripe in use belong to files and objects in the system where the files and objects have not been deleted and the particular contents have not been overwritten. In some embodiments, a "free stripe" refers to a stripe whose data contents have been deleted or overwritten. In general, a RAID subsystem is not aware of which stripes are mapped as used and which are logically free in the file system that is layered above it. Due to this, when a device of the group fails, all of the device's stripes are rebuilt. By storing a bitmap that indicates which stripes of each device of the group are used and which are free in the spare device, in the event of a failed device in the group, such metadata stored in the spare device can be used to rebuild only the used stripes of the device. The bitmap of these stripes, which could otherwise be prohibitively large, can be cached with every stripe write in the spare device, for example. A second example of metadata to be stored in the spare device would be a utilization table of used stripes in the system. A utilization table can provide a summary of used and free space within every stripe in the system. This can be very useful for garbage collection processes. These are examples and the use of space on the spare device is not limited to these examples. In general any type of metadata, that is otherwise prohibitively large, can be stored there.

At 304, the set of data is stored across the group of devices according to a protocol associated with the group of devices. The set of data is striped across the group of devices based on a protocol of data distribution associated with the group of devices. For example, if the group of devices comprises a RAID group, then the data would be striped across the group of devices based on whichever RAID scheme (e.g., RAID 5 and RAID 6) is implemented at the group. The protocol for data distribution associated with the group of devices may require one or more sets of parity information to be generated based on the received set of data and also striped across the group of devices.

At 306, the set of additional data units is stored in a spare device associated with the group of devices. Unlike the data stored in the group of devices, the set of additional data units is not stored according to the protocol of data distribution associated with the group of devices. Instead, in various embodiments, the set of additional data units is stored only on the spare device.

FIG. 4 is a flow diagram showing a process for storing data at a spare device associated with a group of devices in accordance with some embodiments. In the example, process 400 is implemented using RAID layer 102 of FIG. 1.

At 402, a set of data to be stored in a group of devices is received. In various embodiments, the group of devices comprises a group of redundant storage devices. For example, the group of devices comprises a RAID group. The received set of data comprises user data, for example, that is to be stored across various stripes of the group of devices.

At 404, a set of additional data units is determined based at least in part on a portion of the set of data. In process 400, the set of additional data units is generated from at least a portion of the set of data. In some embodiments, the set of additional data units comprises an extra set of parity information that is determined based on a predetermined error correction code (e.g., Reed-Solomon). The extra set of parity information of the set of additional data units is not the same as any already-existing parity information that may be generated and stored on the group of devices according to a protocol of data distribution (e.g., a RAID scheme). The set of additional data units is not designated to be stored in any device within the group of devices but at a spare device that is associated with the group of devices and is typically not utilized unless reconstruction data is to be stored in the spare device.

At 406, the set of data is stored across the group of devices according to a protocol associated with the group of devices. The set of data is striped across the group of devices based on a protocol of data distribution associated with the group of devices. For example, if the group of devices comprises a RAID group, then the data would be striped across the group of devices based on whichever RAID scheme (e.g., RAID 5 and RAID 6) is implemented at the group. The protocol for data distribution associated with the group of devices may require one or more sets of parity information to be generated based on the received set of data and also striped across the group of devices.

At 408, the set of additional data units is stored in a spare device associated with the group of devices. Unlike the data stored in the group of devices, the set of additional data units is not stored according to the protocol of data distribution associated with the group of devices. Instead, in various embodiments, the set of additional data units is stored only on the spare device.

Figure 5:
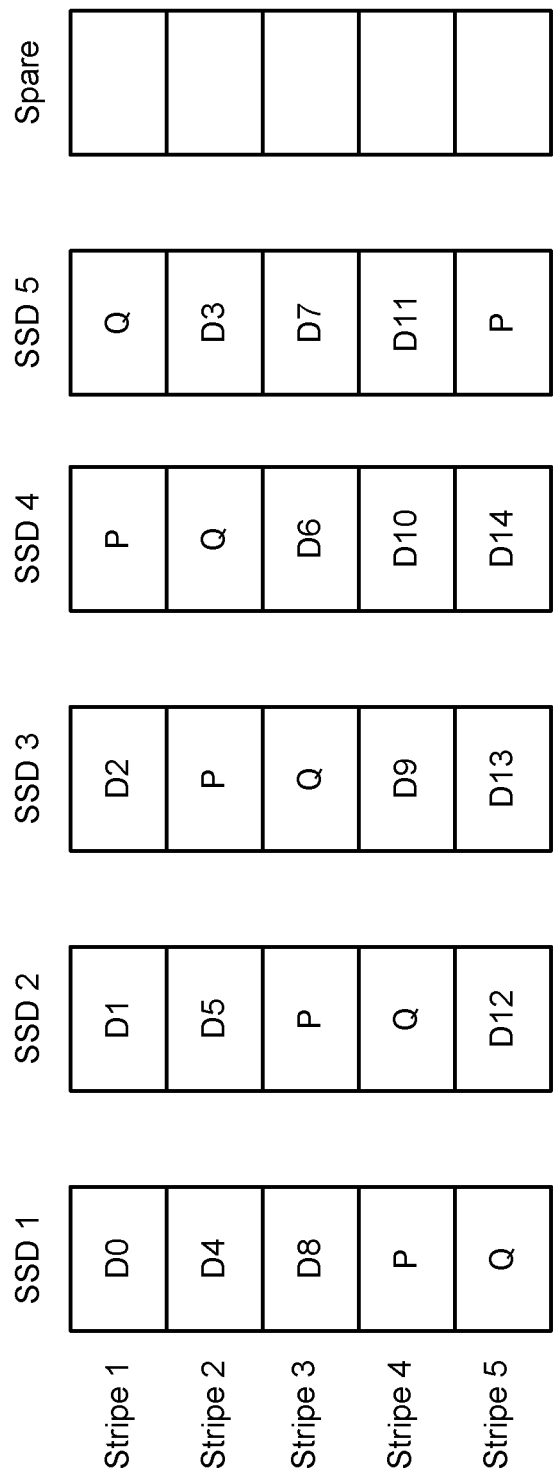
FIG. 5 is an example of a conventional group of devices associated with an SSD-based RAID 6 scheme and a spare device.

FIG. 5 is an example of a conventional group of devices associated with an SSD-based RAID 6 scheme and a spare device. A layout of devices can be described as having M data devices in a group, N parity devices (included in the conventional RAID scheme), and S spare devices. As shown in the example, the RAID 6 group comprises five SSDs with one spare device and is therefore associated with M=5, N=2, and S=1. The RAID 6 scheme includes five data devices and two types of parity information, which are represented as "P" and "Q" in the diagram. The data that is striped across the devices are represented as "D0," "D1," "D2," and so forth. As shown in the example, the RAID 6 scheme rotates the data as well as the P and Q types of parity information across the devices over various stripes. The existence of the P and Q sets of parity information in the conventional RAID 6 scheme provides fault tolerance for up to two failed devices of the group of five devices. Given that FIG. 5 shows a conventional use of a spare device, the spare device remains empty until reconstructed data associated with one of SSD 1, SSD 2, SSD 3, SSD 4, and SSD 5 needs to be stored in the spare device.

Figure 6:
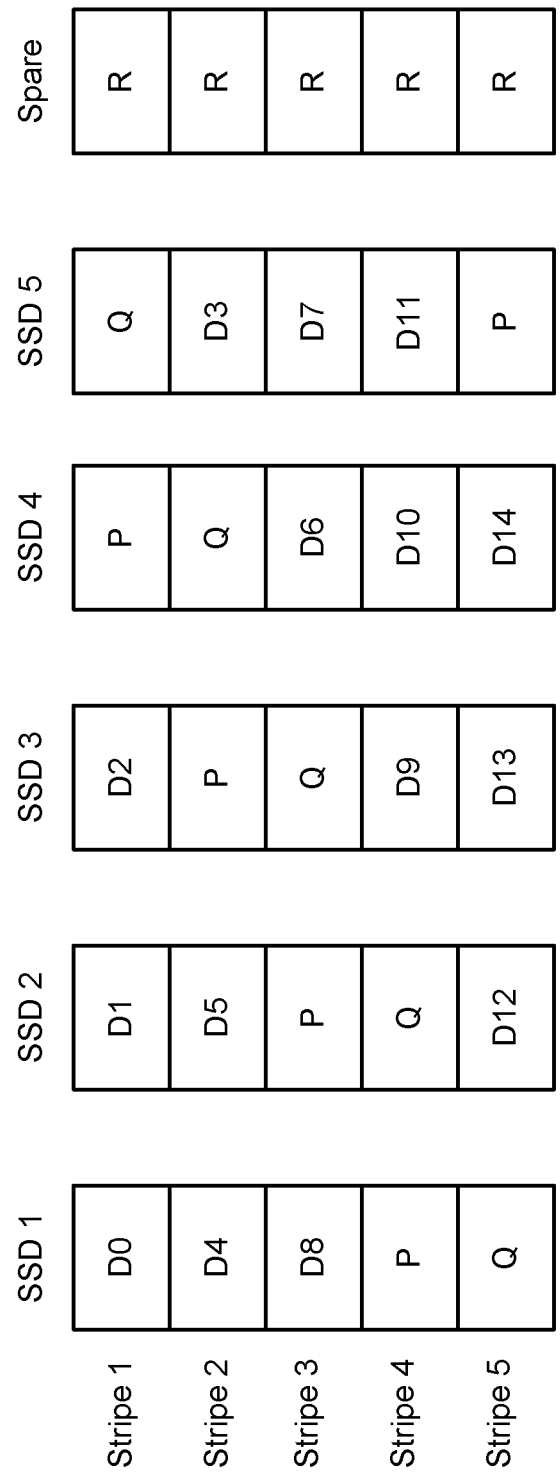
FIG. 6 is an example of a group of devices associated with an SSD-based RAID 6 scheme and a spare device in accordance with some embodiments.

FIG. 6 is an example of a group of devices associated with an SSD-based RAID 6 scheme and a spare device in accordance with some embodiments. Based on some embodiments described herein, an extra set of parity information, R, in addition to the already-existing parities of P and Q in the conventional RAID 6 scheme, can be stored as a set of additional data units in the spare device. R can be encoded independently of P and Q. In some embodiments, the error correction code that is used to encode the R parity information is predetermined. In some embodiments, the complexity of the R parity information (relative to the complexity of P and Q) can be predetermined (since there is a tradeoff between complexity and the cost to compute R). For example, R can be generated based on the Reed-Solomon code. In various embodiments, the R parity information that is stored in a particular stripe unit of the spare device is computed based on at least a portion of the data that is stored in SSD 1, SSD 2, SSD 3, SSD 4, and SSD 5 of the same stripe. For example, the R that is stored in Stripe 1 can be determined based at least in part on a portion of D0 of SSD 1, D1 of SSD 2, and D3 of SSD 3. Unlike the already-existing parities of P and Q in the conventional RAID 6 scheme, the extra set of parity information, R, is stored exclusively at each stripe unit of the spare device and is not rotated across other devices.

The existence of the extra set of parity information, R, on top of the already-existing parities of P and Q in the conventional RAID 6 scheme will provide fault tolerance for an additional failed device. As such, with the implementation of the extra set of parity information, R, up to three failed devices of the group of five devices can be supported. For example, if SSD 1, SSD 2, and SSD 3 failed, then D0 at Stripe 1 of SSD 1, D1 at Stripe 1 of SSD 2, and D2 at Stripe 1 of SSD 3 can be reconstructed using P at Stripe 1 of SSD 4, Q at Stripe 1 of SSD 5, and R at Stripe 1 of the spare device. As such, by storing a set of additional data units that includes an extra set of parity information in the spare device, the system reliability of the group of devices is improved.

Similarly, the existence of the extra set of parity information, R, on top of the already-existing parities of P and Q in the conventional RAID 6 scheme will provide operational improvement of I/O performance of read requests for an additional device. As such, with the implementation of the extra set of parity information, R, up to three devices of the group of five devices that are associated with slow access modes/long latencies can be supported. For example, if SSD 1, SSD 2, and SSD 3 are all determined to be associated with long latencies (e.g., slow access modes), then a request for D0 at Stripe 1 of SSD 1, a request for D1 at Stripe 1 of SSD 2, and a request for D2 at Stripe 1 of SSD 3 can be serviced by reconstructing D0, D1, and D2 using P at Stripe 1 of SSD 4, Q at Stripe 1 of SSD 5, and R at Stripe 1 of the spare device. As such, by storing a set of additional data units that includes an extra set of parity information in the spare device, the I/O performance of the group of devices is improved.

Figure 7:
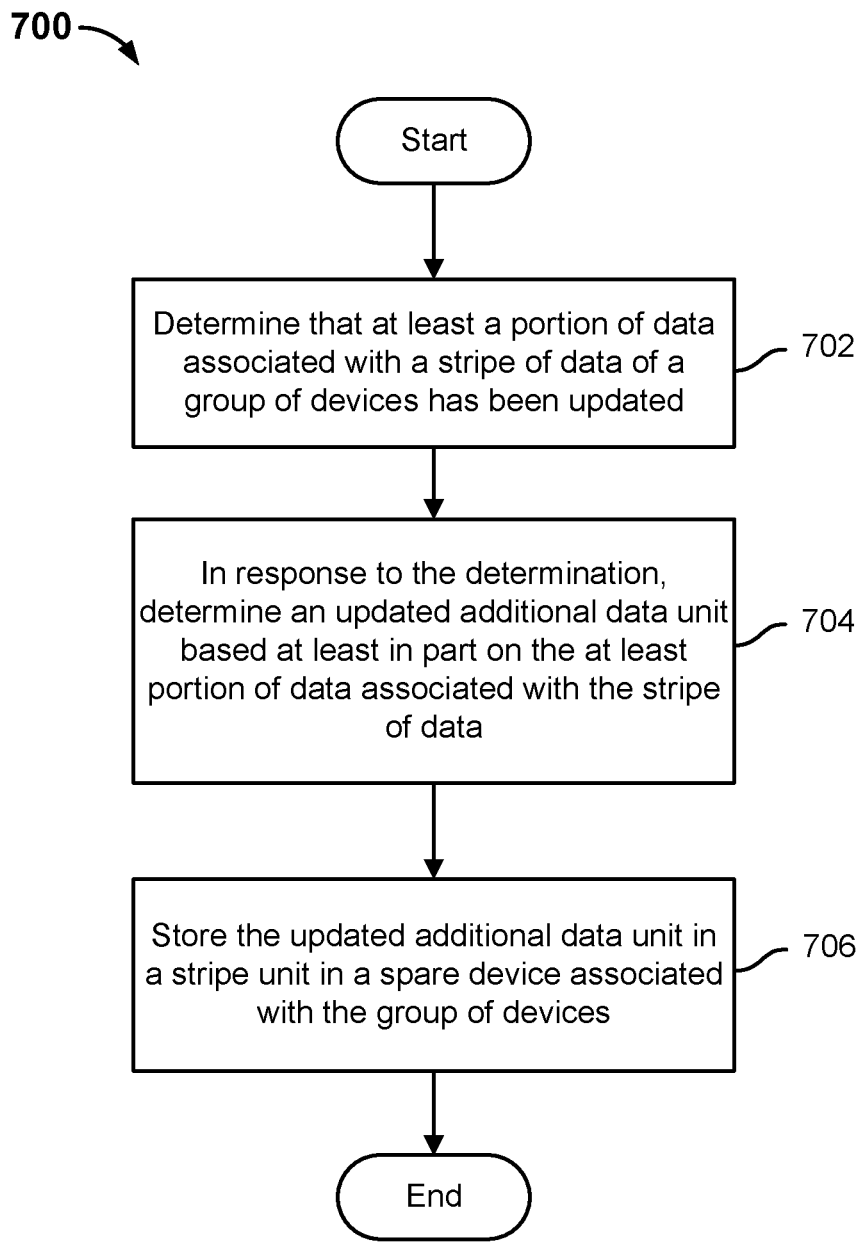
FIG. 7 is a flow diagram showing a process for updating an additional data unit that is stored in a spare device in accordance with some embodiments.

FIG. 7 is a flow diagram showing a process for updating an additional data unit that is stored in a spare device in accordance with some embodiments. In the example, process 700 is implemented using RAID layer 102 of FIG. 1.

Process 700 shows an example process of opportunistically updating an additional data unit in a spare device in the event that the additional data unit comprises extra parity information, whenever data stored in a group of devices at the same stripe is updated.

At 702, it is determined that at least a portion of data associated with a stripe of data of a group of devices has been updated. It is determined that data belonging to a stripe was updated at one or more devices of a group of redundant storage devices (i.e., data has been updated in one or more stripe units of a stripe of data). In various embodiments, the group of redundant storage devices comprises a RAID group. The RAID group is associated with a spare device that stores additional data units that comprise extra parity information that is in addition to the already-existing parity information, if any, that belongs to the RAID scheme implemented for the RAID group.

At 704, in response to the determination, an updated additional data unit is determined based at least in part on the at least portion of data associated with the stripe of data. The updated data is used to determine an updated extra parity information (which is sometimes referred to herein as "R") based on the data that has been updated in the stripe of the group of devices. For example, an R value is updated/recomputed based on the updated data in the stripe. Other parity information of the same stripe may also be updated based on the updated stripe unit(s).

At 706, the updated additional data unit is stored in a stripe unit in a spare device associated with the group of devices. The updated R is stored in a stripe unit in the spare device in the same stripe at which data was updated at one or more of the devices.

For example, returning to the example of FIG. 6, in the event that D0 of SSD 1 at Stripe 1 is updated, parity P at Stripe 1 of SSD 4, parity Q at Stripe 1 of SSD 5, and parity R at Stripe 1 of the spare device are all regenerated and updated at least in part on the updated D0 value.

Figure 8:
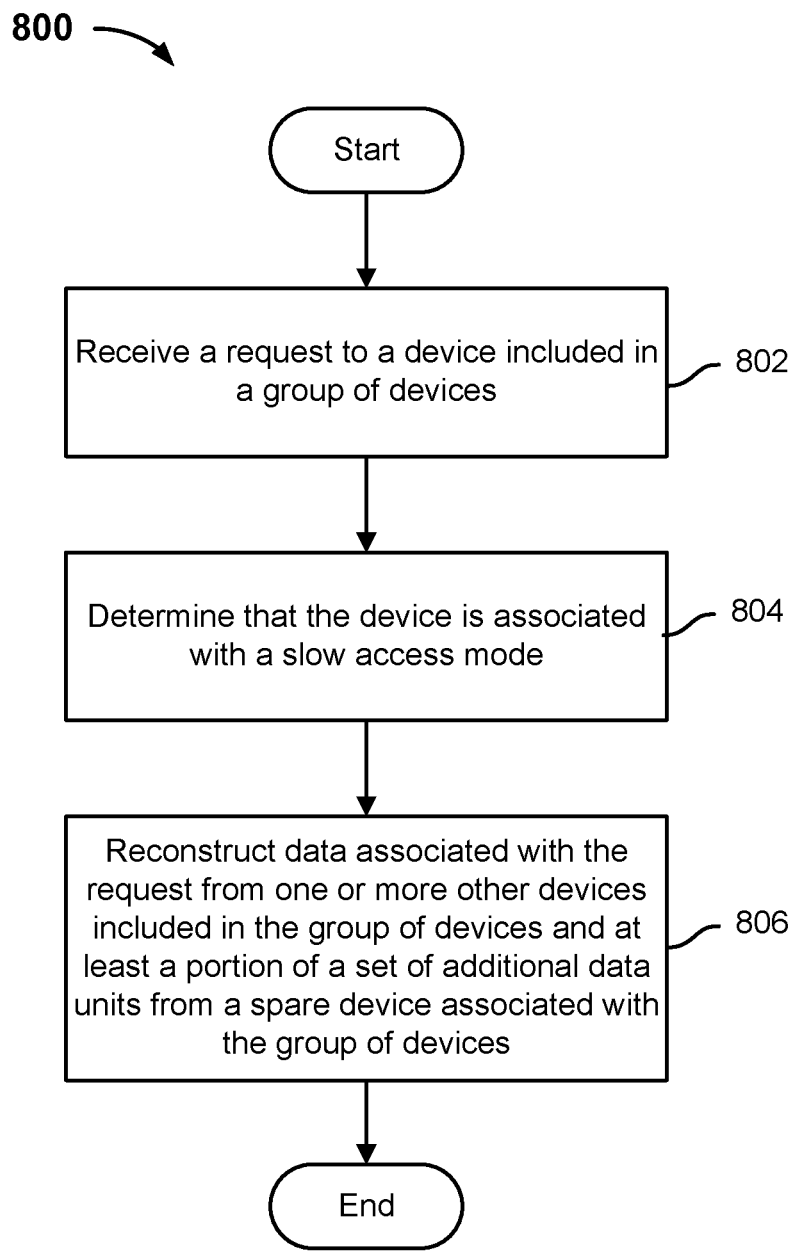
FIG. 8 is a flow diagram showing a process for reconstructing data in response to a request to a device included in a group of devices using an additional data unit that is stored in a spare device in accordance to some embodiments.

FIG. 8 is a flow diagram showing a process for reconstructing data in response to a request to a device included in a group of devices using an additional data unit that is stored in a spare device in accordance to some embodiments. In the example, process 800 is implemented using RAID layer 102 of FIG. 1.

Process 800 shows an example process of improving the read performance of the group of devices by reconstructing data requested from a device included in a group of devices that is associated with a slow access mode. As mentioned above, a device that is in a slow access mode is not necessarily a device that has been determined to have completely failed but rather a device that is presumed to be performing internal activities (e.g., garbage collection, wear leveling, internal metadata persistence), which is causing the device to respond to (e.g., read) requests with relatively higher latencies. As a result of this determination, the data that is requested of this device is reconstructed based on the data stored in other devices of the group as well as at least an additional data unit (e.g., extra parity information) that is stored in a spare device associated with the group of devices.

At 802, a request to a device included in a group of devices is received. In various embodiments, the group of redundant storage devices comprises a RAID group. The RAID group is associated with a spare device that stores additional data units that comprise extra parity information that is in addition to the already-existing parity information, if any, that belongs to the RAID scheme implemented for the RAID group. In some embodiments, a read request is associated with a device based on an identifier included in the request associated with the device. In some embodiments, the request is associated with the device based on a determination that the device stores the requested data.

At 804, it is determined that the device is associated with a slow access mode. In some embodiments, the device is determined to be in a slow access period based on a timeout duration associated with the request timing out. In some embodiments, the device is determined to be in a slow access period based on a state of the device that indicates that the device is currently in a forced slow access period. When the device exits the slow access period, the state of the device is updated to indicate that the device is not currently in a forced slow access period. In some embodiments, when the device is determined to have exited a slow access period is determined by the completion of the command that had forced the device into the slow access period.

At 806, data associated with the request is reconstructed from one or more other devices included in the group of devices and at least a portion of a set of additional data units from a spare device associated with the group of devices. In some embodiments, the requested data can be reconstructed with data obtained from one or more devices of the group other than the device that the request was initially sent to and/or is associated with. For example, the requested data can be retrieved using a reconstruction operation via one or more other devices that also store portions of the requested data and/or parity information that can be used to reconstruct the requested data. In addition to data from the other devices, at least a portion of the additional data units comprising the extra parity information, R, stored in the spare device is also used in reconstructing the data that is requested.

Process 800 shows that embodiments described herein enable the possibility to utilize the extra spare devices that include extra parity information, R, to actively reconstruct read data, lowering overall load on the system and specifically avoiding high latency by temporarily not reading from devices that may be taking a long time to service requests.

Figure 9:
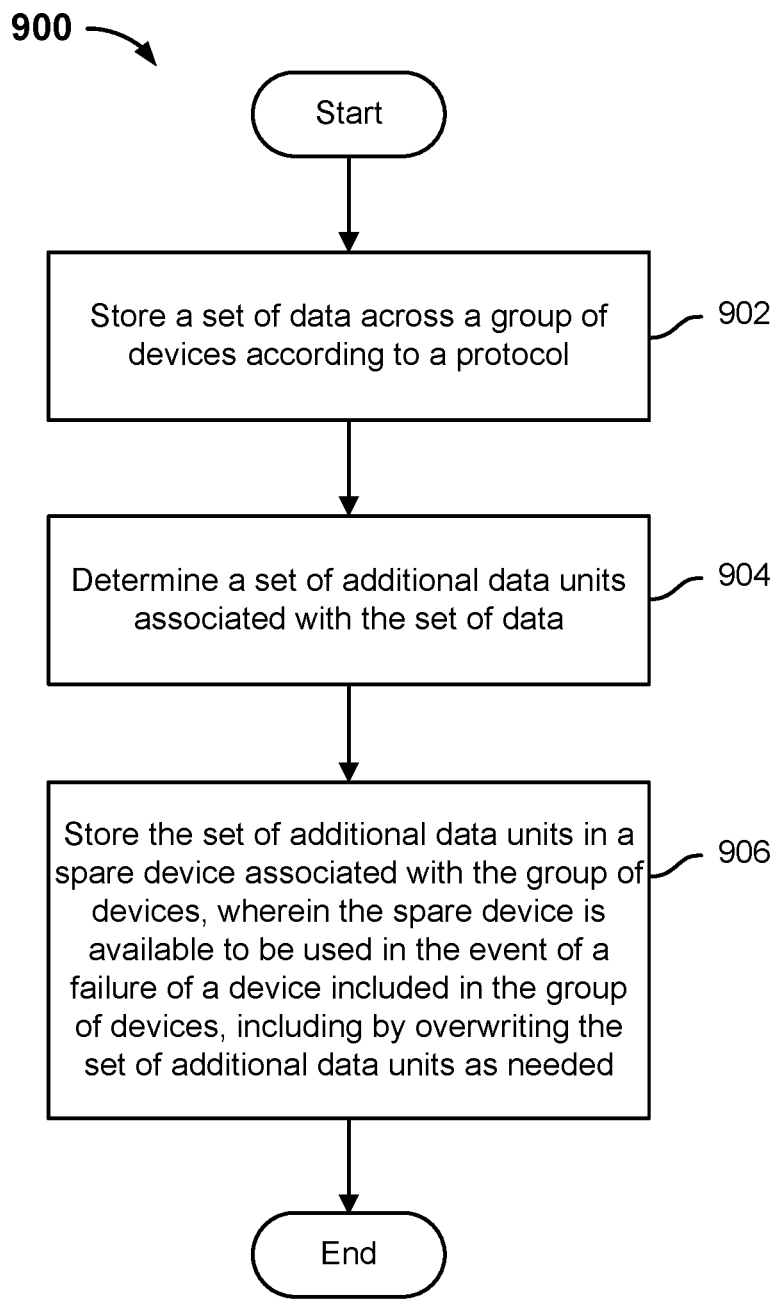
FIG. 9 is a flow diagram showing a process for efficiently using a spare device associated with a group of devices in accordance with some embodiments.

FIG. 9 is a flow diagram showing a process for efficiently using a spare device associated with a group of devices in accordance with some embodiments. In the example, process 900 is implemented using RAID layer 102 of FIG. 1.

At 902, a set of data is stored across a group of devices according to a protocol. In various embodiments, a set of data is striped across a group of redundant storage devices. In various embodiments, the group of devices comprises a RAID group. The set of data is striped across the RAID group based on the RAID scheme that is implemented. For example, the RAID scheme could be RAID 5 and RAID 6.

At 904, a set of additional data units associated with the set of data is determined. In some embodiments, a set of additional data units comprises an extra set of parity information, in addition to any already-existing sets of parity information that are included in the implemented RAID protocol, generated based at least in part on the set of data that is stored at the group of devices. As mentioned above, this extra set of parity information is referred to as "R." In some embodiments, an R parity value can be generated for each stripe of data based on the stripe of data that is stored across the group of devices. In some embodiments, the set of additional data units comprises data and/or metadata to cache at the spare device and is received along with the set of data.

At 906, the set of additional data units is stored in a spare device associated with the group of devices, wherein the spare device is available to be used in the event of a failure of a device included in the group of devices, including by overwriting the set of additional data units as needed. Unlike any sets of parity information that may be stored on the group of devices, the extra set of parity information, R, included in the set of additional data units is stored exclusively at the spare device. In some embodiments, the R parity value that is generated based on the data stored at a particular stripe of the group of devices is stored at the corresponding stripe of the spare device. In the event that the set of additional data units comprises data and/or metadata to cache at the spare device, such data and/or metadata is also stored exclusively at the spare device.

In the event that the data associated with a device in the group of devices is to be reconstructed (e.g., due to a detected failure of that device), the data associated with the failed device can be reconstructed based at least in part on the extra set of parity information that is stored in the spare device. In various embodiments, reconstructed data comprises data that is generated based on existing data values and/or parity values stored on available (e.g., not failed) one or more devices, including the spare device. The reconstructed data is stored at the spare device over the course of a reconstruction operation by overwriting the R parity values. As data is reconstructed, the R parity values stored in the spare SSD will no longer be updated for the reconstructed values that are stored at each stripe of the spare device. In some other embodiments, reconstructed data comprises data that is relocated from an available device, including the spare device.

Figure 10:
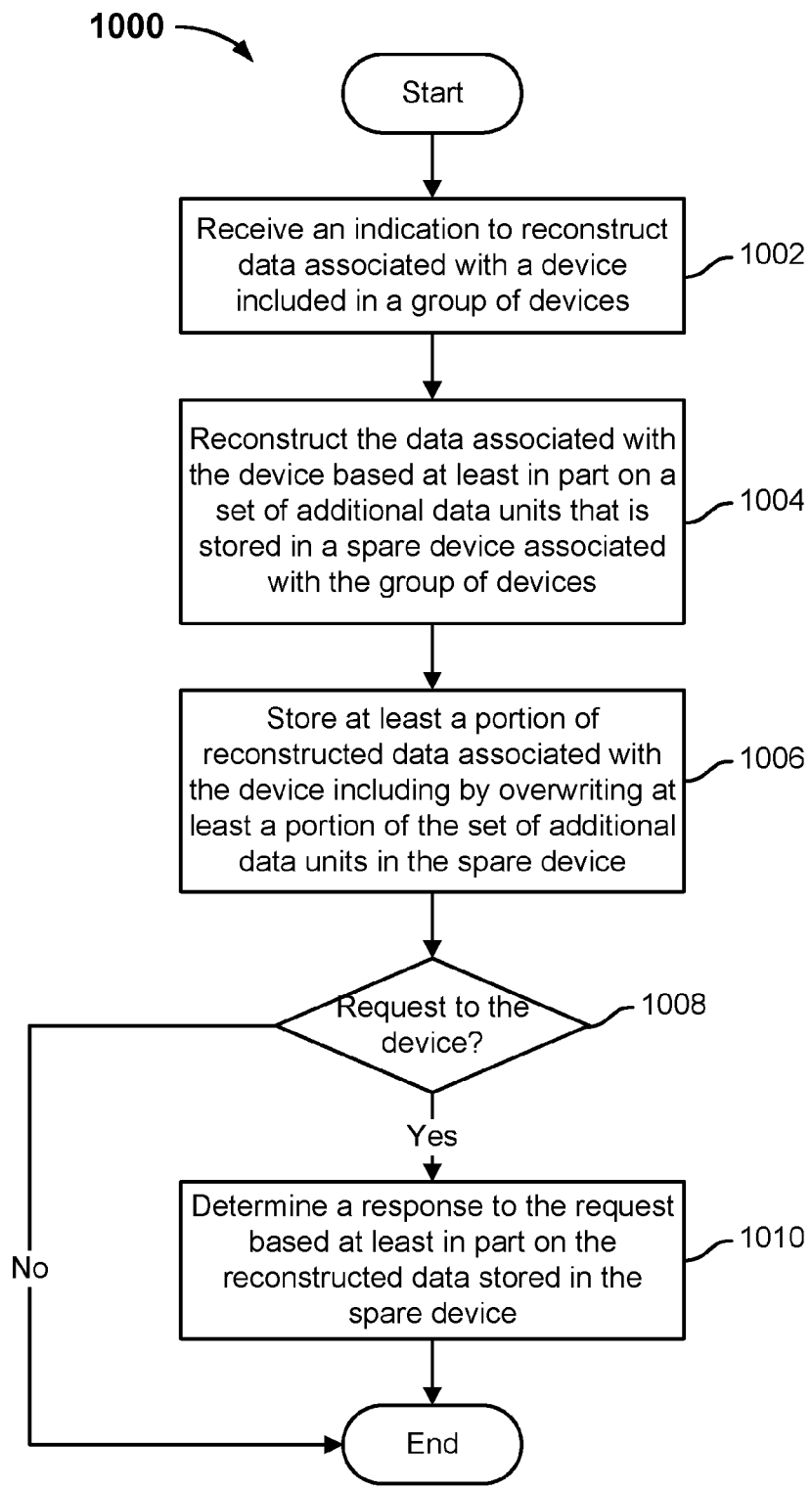
FIG. 10 is a flow diagram showing a process for reconstructing data associated with a failed device in a group of devices in accordance to some embodiments.

FIG. 10 is a flow diagram showing a process for reconstructing data associated with a failed device in a group of devices in accordance to some embodiments. In the example, process 1000 is implemented using RAID layer 102 of FIG. 1. In some embodiments, step 906 of process 1000 of FIG. 10 can be implemented using process 1000.

At 1002, an indication to reconstruct data associated with a device included in a group of devices is received. In various embodiments, the group of devices comprises a RAID group. For example, data stored in a particular device in the RAID group needs to be reconstructed in the event that the device has failed.

At 1004, the data associated with the device is reconstructed based at least in part on a set of additional data units that is stored in a spare device associated with the group of devices. In various embodiments, the set of additional data units that is stored in the spare device that is associated with the RAID group comprises an extra set of parity information, R, which can be used to reconstruct the data stored on the failed device.

At 1006, at least a portion of reconstructed data associated with the device is stored including by overwriting at least a portion of the set of additional data units in the spare device. For example, after a stripe of data associated with the failed device is reconstructed based on a corresponding R value stored in that same stripe of the spare device, the reconstructed portion of data is stored in the spare device by overwriting the same R value that was used to reconstruct the data.

At 1008, it is determined whether a request associated with the device is received during the reconstruction operation. In the event that a request to the failed device is received during the reconstruction operation, control is transferred to 1010. Otherwise, in the event that no request to the failed device is received during the reconstruction operation, process 1000 ends. During the reconstruction of data stored on the failed device, any requests that are directed to the failed device are redirected to the same data in the spare device that is storing the reconstructed data.

At 1010, a response to the request is determined based at least in part on the reconstructed data stored in the spare device. The reconstructed data stored in the spare device can be used to respond to the redirected request.

In some embodiments, when reconstruction starts, data on the failed device of the group of devices will be rebuilt on the spare drive associated with the group of devices. In the middle of reconstruction, a user may pull/remove the failed device out and insert a new device for replacement. This new device will be automatically converted into the new spare device that is associated with the group of devices, which means both the original spare device and the new spare device drive may hold valid additional data units (e.g., the extra set of parity information, R) at the same time, until the reconstruction operation is completed. In various embodiments, auxiliary metadata is stored to keep track of the data and extra parity, R, layout for every stripe. In various embodiments, auxiliary metadata is used to keep track of how many R parities are regenerated on the new spare disk after it is inserted into the RAID, and how many R parities on the old spare device are still valid. The auxiliary metadata should be maintained until the R parities for all the stripes are regenerated on the new spare device to avoid starting over when there is a crash during this process. In some embodiments, the auxiliary metadata is cached in memory and then stored persistently as part of the RAID group metadata. In some embodiments, "RAID group metadata" refers to information (non-user data) that is necessary to manage the RAID group. After the R parities for all the stripes are regenerated, the auxiliary metadata can be deleted. It is possible that during some times, for some stripes, R parity is neither stored in the original spare device nor stored in the new spare device. The auxiliary metadata can help track this state accurately. The internal I/O parallelism feature of SSD makes it possible to copy valid R parities from the original R spare device (which is now used for rebuilding the failed device) to the new R spare device to expedite the R parity generation process. The internal I/O parallelism of SSD refers to the fact that SSD comprises multiple SSD chips and SSD chips and such chips can perform read/write operations independently and in parallel. In other words, SSD can service multiple requests at the same time. This feature enables valid R parities to be copied from the original R spare device while the reconstructed data is simultaneously written to the original R spare device. In some embodiments, the extra auxiliary metadata necessary can be reduced to a few bits per stripe so it is very efficient to maintain it.

Figure 11:
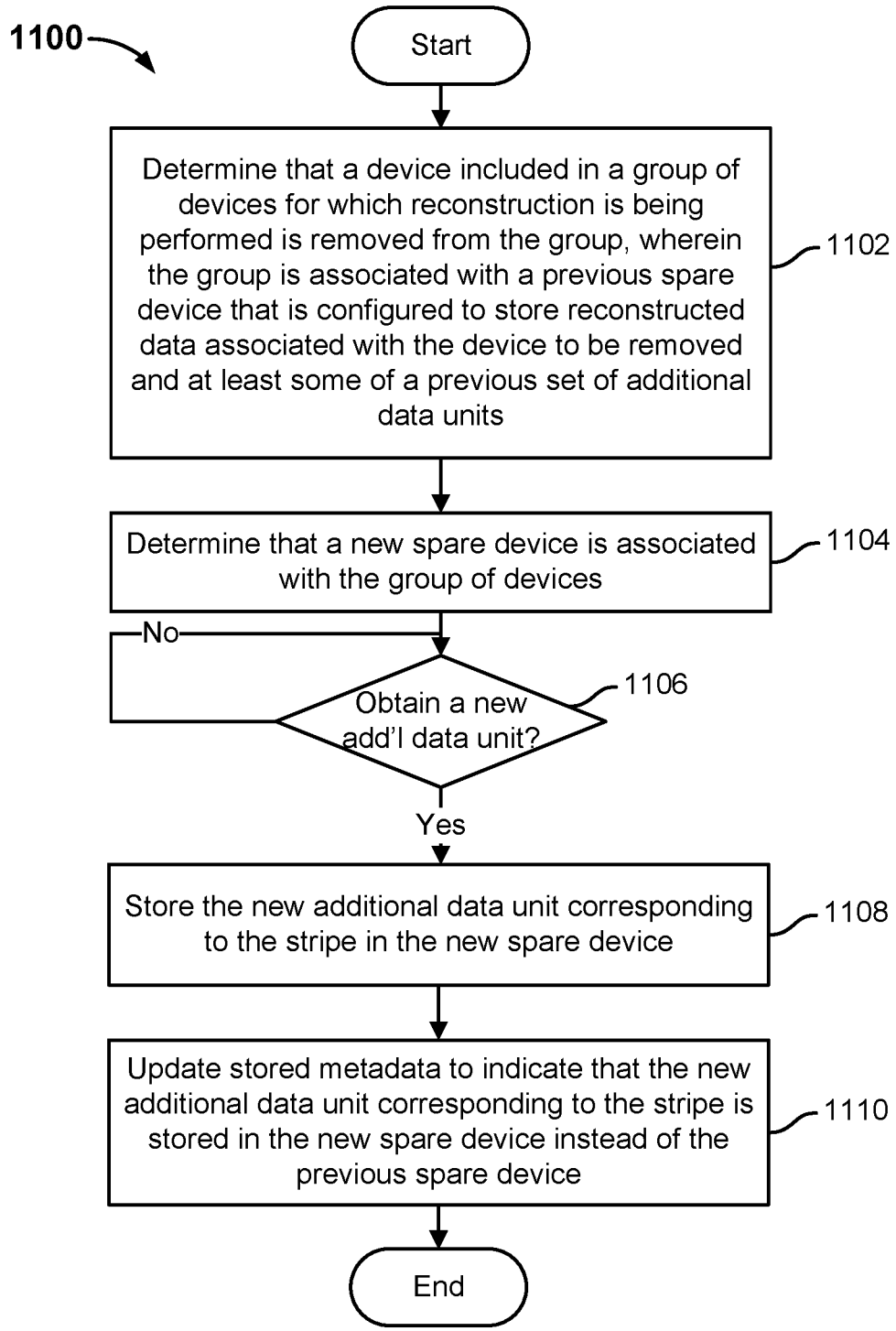
FIG. 11 is a flow diagram showing a process for updating metadata that tracks which spare device an additional data unit comprising an extra parity value corresponding to a stripe of data is stored on during a reconstruction process in accordance with some embodiments.

FIG. 11 is a flow diagram showing a process for updating metadata that tracks which spare device stores an additional data unit comprising an extra parity value corresponding to a stripe of data during a reconstruction process in accordance with some embodiments. In the example, process 1100 is implemented using RAID layer 102 of FIG. 1.

In the example of process 1100, the additional data units that are stored in a spare device associated with a group of devices comprises extra parity values (R values). Process 1100 is an example process by which auxiliary metadata that tracks, during the reconstruction of data associated with a failed device included in the group of devices, whether the previous spare device, which is currently storing the reconstructed data of the failed device, or the new spare device, which is newly added, stores an R parity value for a certain stripe of data.

At 1102, it is determined that a device included in a group of devices for which reconstruction is being performed is removed from the group, wherein the group is associated with a previous spare device that is configured to store reconstructed data associated with the device to be removed and at least some of a previous set of additional data units. A device that has been determined to have failed is removed (e.g., by a user) from a group of redundant storage devices. A reconstruction operation is then initiated to reconstruct the data of the failed device based at least in part on the data values and/or parity values that are stored at other devices of the group, including at least R parity values stored in a spare device that is associated with the group of devices. During the reconstruction process, portions of reconstructed data are stored at the spare device by overwriting the R parity values (that were used during the reconstruction operation) that are stored at the spare device.

At 1104, it is determined that a new spare device is associated with the group of devices. Since the spare device that was originally associated with the group of devices is now used to store the reconstructed data associated with the spare device, a new, empty spare device is added to replace the previous, original spare device.

At 1106, it is determined whether a new additional data unit comprising an extra parity value corresponding to a stripe of data is obtained. In the event that a new additional data unit comprising an extra parity value is obtained, control is transferred to 1308. Otherwise, in the event that a new additional data unit comprising an extra parity value is not obtained, process 1100 waits until a new additional data unit is obtained. In some embodiments, new R parity values are obtained for a particular stripe of data lazily or opportunistically. For example, if a stripe of data that includes reconstructed data of the failed device is updated, then a new R value can be generated based at least in part on the updated data of that stripe and then stored in a stripe unit in the new spare device. In some embodiments, the R parity values of the previous spare device (that is now used to store reconstructed data) are copied over to the new spare device before they are overwritten with reconstructed data at the previous spare device.

At 1108, the new additional data unit corresponding to the stripe is stored in the new spare device.

At 1110, stored metadata is updated to indicate that the new additional data unit corresponding to the stripe is stored in the new spare device instead of the previous spare device. Once a new R value corresponding to a particular stripe of data is stored in the new spare device, auxiliary metadata can be updated to identify that the R value associated with that particular stripe of data is now stored in the spare device. This auxiliary metadata can be read to determine which of the previous, original spare device or the new spare device stores an R value corresponding to a particular stripe of data during the reconstruction operation, when both previous, original spare device or the new spare device can store R values. For example, the auxiliary metadata can be used when the extra parity R value corresponding to a particular stripe is needed to reconstruct data in response to a request to a device in a slow access mode. In some embodiments, the auxiliary metadata comprises a sequence number.

FIGS. 12A through 12D show an example of reconstructing data of a failed device included in a group of devices in accordance to some embodiments.

Figure 12A:
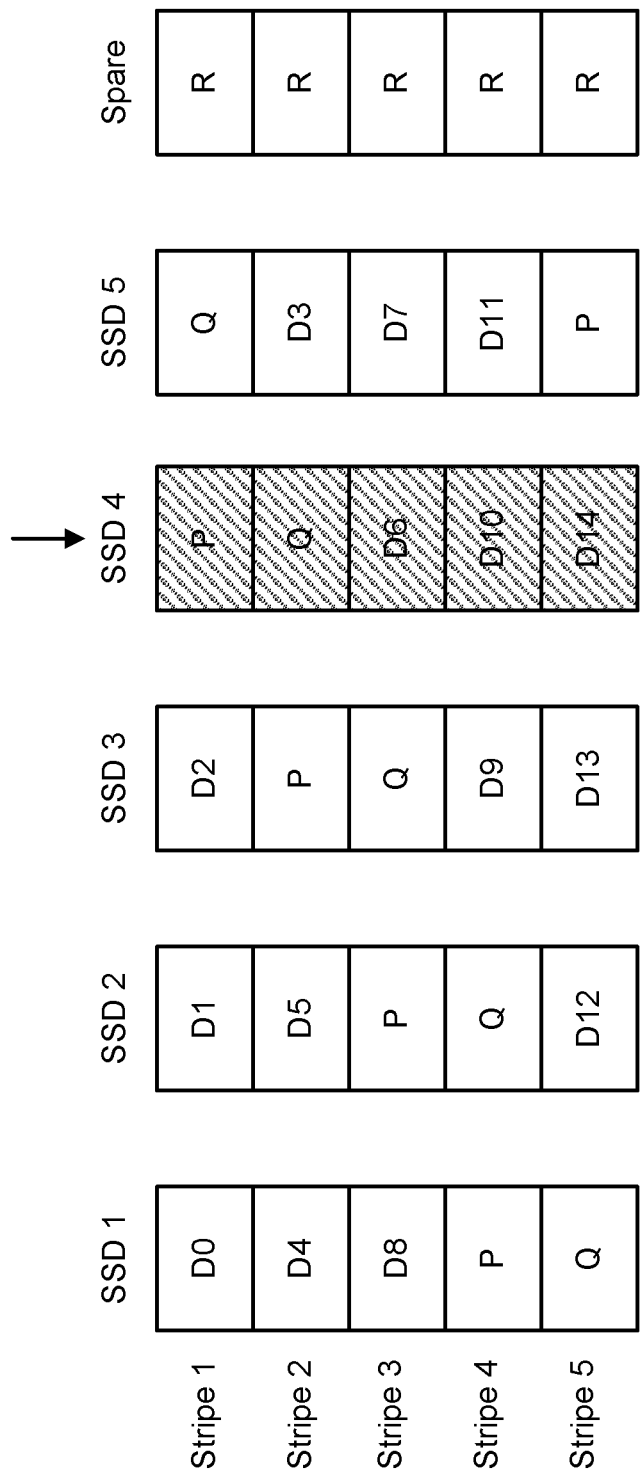
FIGS. 12A through 12D show an example of reconstructing data of a failed device included in a group of devices in accordance to some embodiments.

FIG. 12A shows a diagram including a group of five SSDs and a spare SSD. As shown in the example, the group comprises an M=3, N=2, and S=1 RAID 6 group setup. In the example, SSD 4 has failed and its data is to be reconstructed at the spare SSD, which is currently storing R parity values across all five stripe units.

Figure 12B:
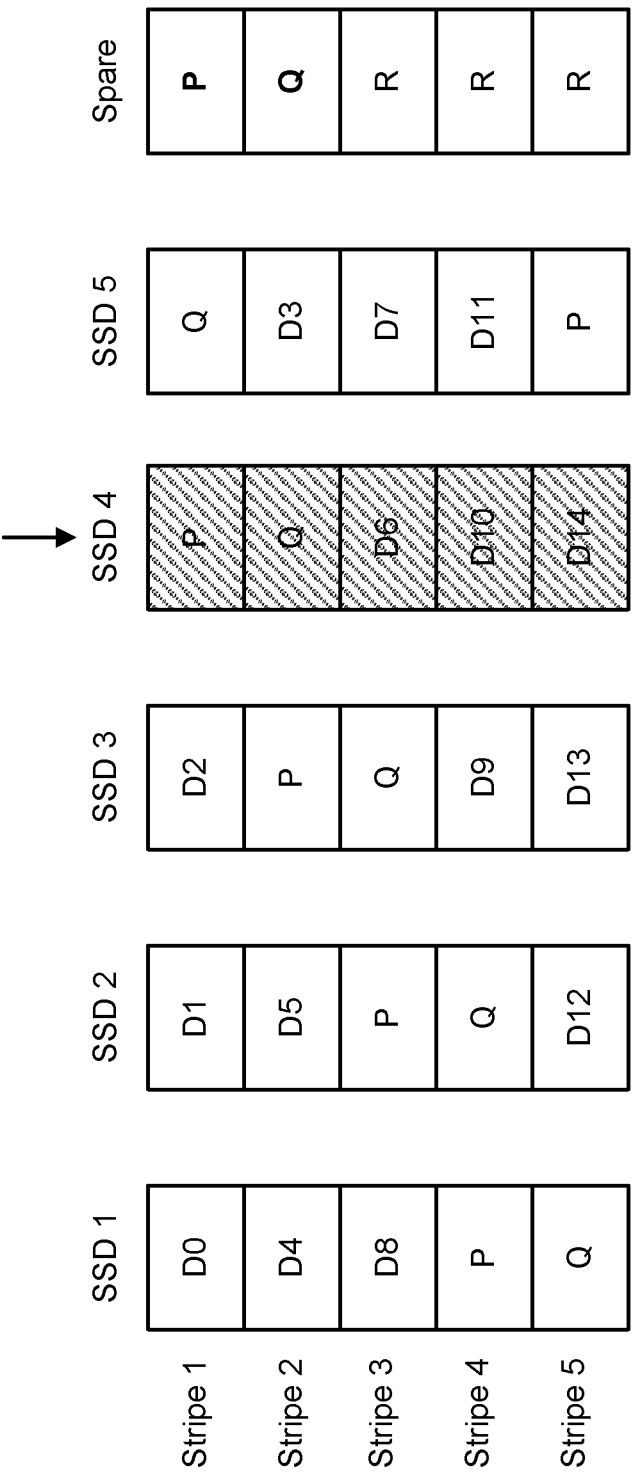

FIG. 12B shows a diagram depicting reconstructed data being stored at the spare device. As shown in the example, the reconstructed data of failed SSD 4 has been computed for Stripes 1 and 2, based at least in part on the R parity values that were stored at Stripes 1 and 2 of the spare SSD. The reconstructed data of SSD 4 at Stripes 1 and 2 were then written over their corresponding R parity values that were stored at Stripes 1 and 2 of the spare SSD.

Figure 12C:
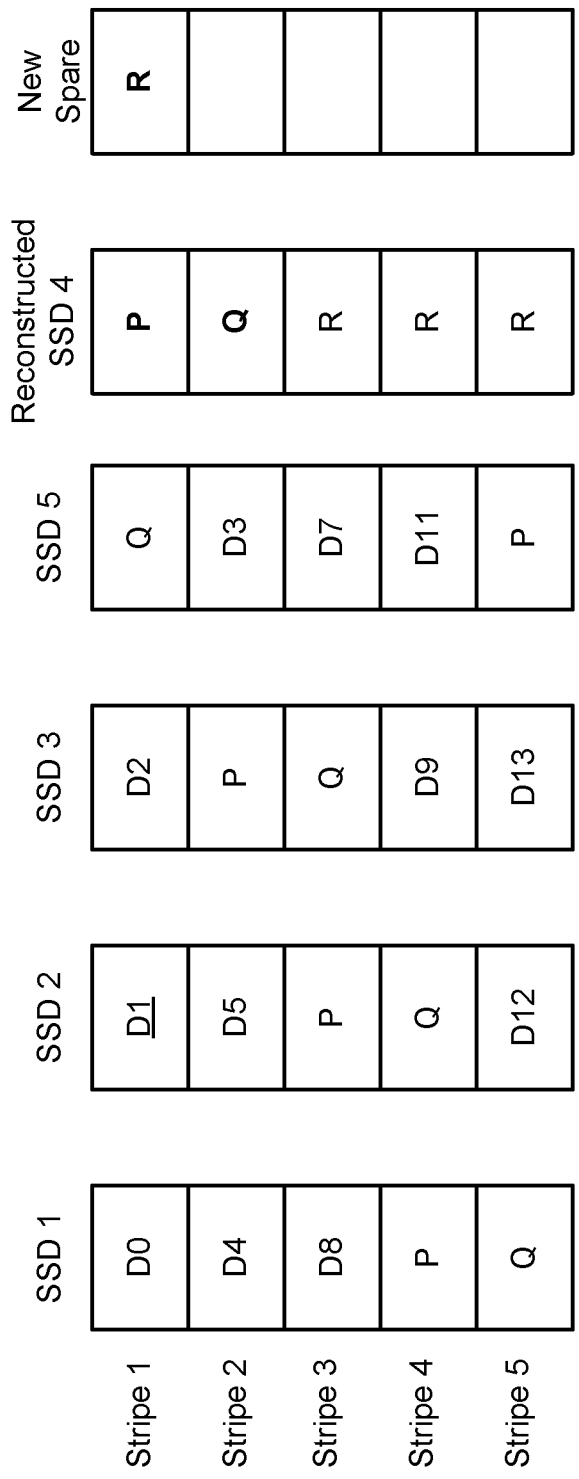

FIG. 12C shows a diagram depicting a new spare SSD being added during the ongoing reconstruction operation. Failed SSD 4 has been removed. Also, a new spare SSD is associated with the group of devices while reconstruction of the data of SSD 4 is being generated and stored at the previous spare device, which is now referred to as "Reconstructed SSD 4." In the example of FIG. 14C, new R parity values are opportunistically written to the new spare SSD, such as when a data value in a stripe of data is updated, for example. In the example, D1 of SSD 2 is updated and as a result, a new R parity value is computed based on the updated D1 value and then stored at a stripe unit of the same stripe in the new spare device. In some embodiments, auxiliary metadata can be updated to indicate that for Stripe 1, a corresponding parity value is stored at the new spare SSD while R parity values for Stripes 3, 4, and 5 are still stored at the previous spare SSD, or now Reconstructed SSD 4.

Figure 12D:
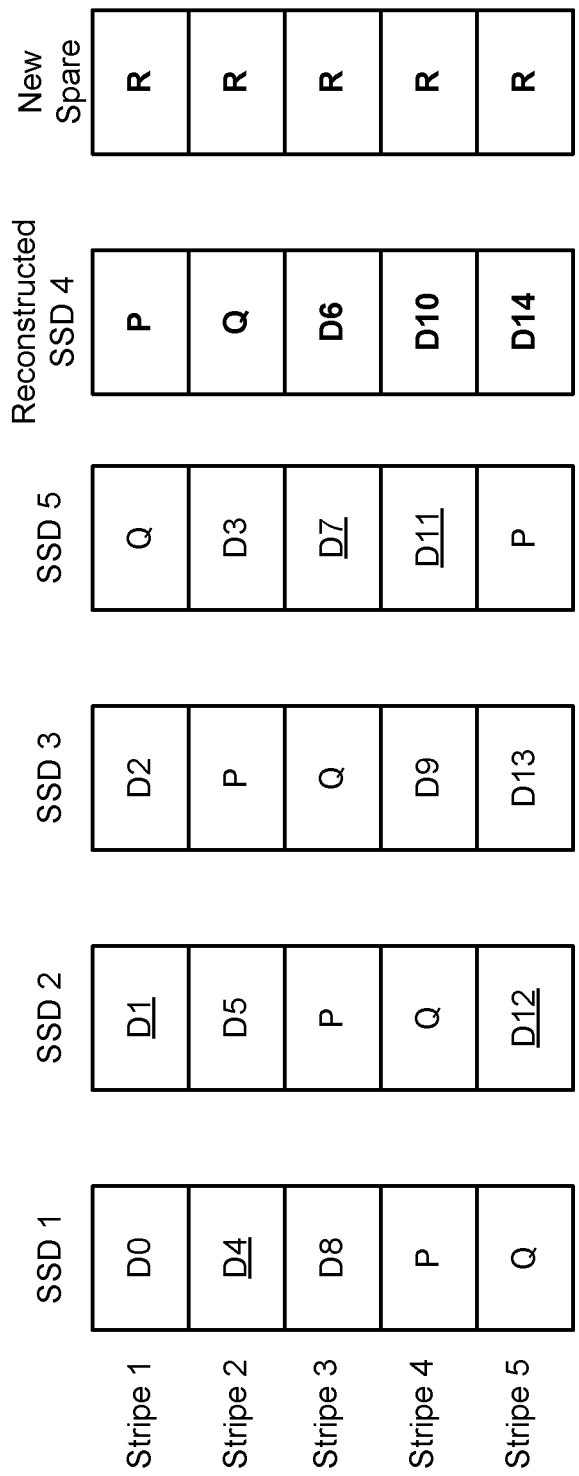

FIG. 12D shows a diagram depicting the previous spare SSD after the completion of the R parity regeneration operation. After the completion of the reconstruction of the data of the failed SSD and the completion of the R parity generation operation onto the new spare SSD, the previous spare SSD now stores all the reconstructed data of failed SSD 4 and no R parity values (as they have all been rewritten by the reconstructed data). Also, as shown in the example, the new spare SSD eventually stores R parity values in stripe units in all the stripes of data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface configured to receive a set of data; and
a processor configured to:
store the set of data across a group of devices according to a protocol;
determine a set of additional data units associated with the set of data;
store the set of additional data units in a spare device associated with the group of devices, wherein the spare device is available to be used in the event of a failure of a device included in the group of devices, including by overwriting the set of additional data units as needed and the spare device comprises a previous spare device; and
determine that a new spare device being added during reconstruction is associated with the group of devices;
determine, during the reconstruction, a new additional data unit corresponding to a stripe of data associated with the group of devices;
store, during the reconstruction, the new additional data unit corresponding to the stripe of data in the new spare device; and
update, during the reconstruction, stored metadata to indicate that the new additional data unit corresponding to the stripe of data is stored in the new spare device instead of the previous spare device.

2. The system of claim 1, wherein the group of devices comprise a redundant array of independent disks (RAID) group.

3. The system of claim 1, wherein the protocol comprises one of the following: RAID 5 and RAID 6.

4. The system of claim 1, wherein the set of additional data units comprises data associated with a lower performance storage tier.

5. The system of claim 1, wherein the set of additional data units comprises metadata associated with one or more stripes of data stored in the group of devices.

6. The system of claim 1, wherein the set of additional data units comprises a set of parity information that is not included in the protocol.

7. The system of claim 1, wherein the processor is further configured to:
determine that at least a portion of data associated with a stripe of data of the group of devices has been updated;
in response to the determination that at least a portion of data associated with a stripe of data of the group of devices has been updated, determine an updated additional data unit based at least in part on the at least portion of data associated with the stripe of data; and
store the updated additional data unit in a stripe unit in the spare device.

8. The system of claim 1, wherein the failed device comprises a first device and wherein the processor is further configured to:
- receive a request to a second device included in the group of devices;
- determine that the second device is associated with a slow access mode; and
- reconstruct data associated with the request from one or more other devices included in the group of devices and at least a portion of the set of additional data units stored in the spare device.

9. The system of claim 1, wherein in the event of the failure of the device, the processor is further configured to store reconstructed data associated with the device in the spare device by overwriting at least some of the set of additional data units stored in the spare device with the reconstructed data.

10. The system of claim 9, wherein the processor is further configured to:
- receive a request to the device subsequent to storing the reconstructed data associated with the device in the spare device; and
- determine a response to the request based at least in part on the reconstructed data stored in the spare device.

11. A method, comprising:
- receiving a set of data;
- storing the set of data across a group of devices according to a protocol;
- determining a set of additional data units associated with the set of data; and
- storing the set of additional data units in a spare device associated with the group of devices, wherein the spare device is available to be used in the event of a failure of a device included in the group of devices, including by overwriting the set of additional data units as needed and the spare device comprises a previous spare device; and
- determining that a new spare device being added during reconstruction is associated with the group of devices;
- determining, during the reconstruction, a new additional data unit corresponding to a stripe of data associated with the group of devices;
- storing, during the reconstruction, the new additional data unit corresponding to the stripe of data in the new spare device; and
- updating, during the reconstruction, stored metadata to indicate that the new additional data unit corresponding to the stripe of data is stored in the new spare device instead of the previous spare device.

12. The method of claim 11, wherein the set of additional data units comprises metadata associated with one or more stripes of data stored in the group of devices.

13. The method of claim 11, wherein the set of additional data units comprises a set of parity information that is not included in the protocol.

14. The method of claim 11, further comprising:
- determining that at least a portion of data associated with a stripe of data of the group of devices has been updated;
- in response to the determination, determining an updated additional data unit based at least in part on the at least portion of data associated with the stripe of data; and
- storing the updated additional data unit in a stripe unit in the spare device.

15. The method of claim 11, wherein the device comprises a first device and further comprising:
- receiving a request to a second device included in the group of devices;
- determining that the second device is associated with a slow access mode; and
- reconstructing data associated with the request from one or more other devices included in the group of devices and at least a portion of the set of additional data units stored in the spare device.

16. The method of claim 11, wherein in the event of the failure of the device, further comprising storing reconstructed data associated with the device in the spare device by overwriting at least some of the set of additional data units stored in the spare device with the reconstructed data.

17. The method of claim 16, further comprising:
- receiving a request to the device subsequent to storing the reconstructed data associated with the device in the spare device; and
- determining a response to the request based at least in part on the reconstructed data stored in the spare device.

18. A computer program product, the computer program product being embodied in a non-transitory computer-readable storage medium and comprising computer instructions for:
- receiving a set of data;
- storing the set of data across a group of devices according to a protocol;
- determining a set of additional data units associated with the set of data; and
- storing the set of additional data units in a spare device associated with the group of devices, wherein the spare device is available to be used in the event of a failure of a device included in the group of devices, including by overwriting the set of additional data units as needed and the spare device comprises a previous spare device; and
- determining that a new spare device being added during reconstruction is associated with the group of devices;
- determining, during the reconstruction, a new additional data unit corresponding to a stripe of data associated with the group of devices;
- storing, during the reconstruction, the new additional data unit corresponding to the stripe of data in the new spare device; and
- updating, during the reconstruction, stored metadata to indicate that the new additional data unit corresponding to the stripe of data is stored in the new spare device instead of the previous spare device.

* * * * *